3,558,576
PROCESS FOR THE PRODUCTION OF FINELY
DIVIDED STYRENE-BUTADIENE COPOLYMERS
Wolfgang Weller, Bulle, Switzerland, assignor to Coathylene S.A., Fribourg, Switzerland, a corporation of Switzerland
No Drawing. Filed Feb. 6, 1968, Ser. No. 703,276
Claims priority, application Austria, Feb. 9, 1967,
A 1,259/67
Int. Cl. C08d 5/00; C08f 1/92
U.S. Cl. 260—85.1                                    6 Claims

ABSTRACT OF THE DISCLOSURE

A process for the production of finely divided styrene-butadiene copolymers from a corresponding coarser copolymer composition which comprises dissolving the coarser material in a homogeneous solvent mixture which consists of at least one solvent for the copolymer and at least one non-solvent for the copolymer, the non-solvent part having a higher boiling point than that of the solvent; thereafter removing from the mixture by vacuum distillation the solvent portion to an extent at least sufficient that the dissolved copolymer is precipitated in the form of a dispersion, and finally purifying the material thus precipitated by treating it with further non-solvent which is homogeneously miscible with the residual liquid.

---

This invention relates to a process for the production of finely divided styrene-butadiene copolymers from a corresponding coarser material, e.g. pellets or granules. The new process permits especially the processing of specific styrene-butadiene copolymers having a stereospecific structure to form finely divided powders.

It is known that certain styrene-butadiene copolymers even in uncured or unvulcanized state have astonishingly satisfactory properties with respect to rubber elasticity which are achieved in case of the known rubbers only by vulcanization. The materials with which the invention is concerned are stereospecific materials such as the product marketed under the trade name of "Cariflex" K–101 of Shell which has a styrene content of about 23 to 24%. In uncured state, these copolymers are characterized by a combination of properties, e.g. considerable temperature dependence of the physical properties and lacking resistance to solvents, which is a barrier to the processing of the material to a powder by conventional processes. However, it would be very desirable and advantageous to obtain the material in finely divided state which would be useful, for example, in coating applications, e.g. for coating carpet backings and for coating metals by the fluidized-bed technique. A further interesting use is in the manufacture of automobile tyres. It is an object of this invention to convert generally polymers of the type of styrene-butadiene copolymers and especially corresponding stereospecific materials into the finely divided state.

It is known to pulverize finely divided polyethylene with the concomitant use of a solvent mixture through the dissolved phase and with the concomitant use of non-solvents for polyethylene. An attempt to apply corresponding prior art teachings to products such as "Cariflex" had the result that more or less lumpy masses hardening to form pieces rather than finely divided powders are obtained. The particle size of these lumpy products is partially greater than that of the starting granules. It appeared in these experiments that especially the solubility of the stereospecific styrene-butadiene copolymer is responsible for this phenomenon, this solubility being less dependent upon temperature than that of polyethylene so that all ordinary solvents for the copolymers dissolve the same partially already at low temperatures or at least cause them to swell highly. However, it has been found in these studies that it is possible by selecting a proper balance between the operational steps and process conditions to precipitate the copolymer in finely divided form in liquids thereby giving primarily a suspension or dispersion of the finely divided material in a liquid. It is further possible in accordance with the invention by an operating technique which is adapted to the particular conditions of this material to isolate this material which has been primarily precipitated in finely divided form from its dispersion or suspension and obtain it eventually as a dry solid.

Accordingly, it is an object of the present invention to provide a process for the production of finely divided styrene-butadiene copolymers from a correspondingly coarser and especially stereospecific copolymer composition, the process comprising dissolving the starting material used, for example, in lumpy form at a temperature which is at best moderately elevated in a solvent mixture which consists of at least one solvent for the copolymer and at least one non-solvent for the copolymer, the non-solvent part having a higher boiling point than that of the solvent; thereafter removing from the mixture, especially by vacuum distillation, the solvent portion to an extent at least sufficient that the dissolved copolymer is precipitated in the form of a dispersion, and finally purifying the material thus precipitated by treating it with at least one further non-solvent which is homogeneously miscible with the residual liquid. The term "purification" as used herein is understood to be a possibly multi-step dilution of that liquid portion which is still present in the mixture after precipitation of the copolymer in finely divided form. The prescribed solid particles which are still swollen or partially swollen exchange their liquid content when treated with different media until an equilibrium has been established, i.e. until the composition of the liquid in the solid particles has adapted itself to that of the liquid medium. The "purifying agents," i.e. the further non-solvents used in accordance with the invention to remove the residual portions of the initial solvent mixture should be desirably selected in such a manner that the liquid content of the solid particles is reduced, i.e. that the latter are transferred from the superficially dissolved or swollen state into a less partially swollen or at best still superficially wetted state. In this manner, the subsequent processing of the precipitated product to the dry powder is substantially facilitated. As will be explained in detail hereafter, it is accordingly preferred in the process of the invention to use solvents having increasing nonsolvent properties for the copolymer for the purification described herein.

The essential first process step according to the invention comprises the dissolution of the coarse copolymer composition in a solvent mixture which consists of at least one solvent for the copolymer and at least one non-solvent for the copolymer, it being necessary that the solvent and the non-solvent are homogeneously miscible. These are organic liquids which are characterized by their solvent properties with respect to the copolymer. The terms "solvent" and "non-solvent" as used herein are understood to be colloquialisms conventional in chemistry for such definitions in connection with polymeric compounds. It is obvious that there are substantially no organic "non-solvents" which have no dissolving action at all on the polymer. In colloquial usage, non-solvents for synthetic polymers are understood to be those compounds which do not dissolve substantial amounts of the polymer at the process temperature used. Accordingly, the "solvents" are compounds which are capable at the process temperature of dissolving considerable amounts of the polymer. The definitions used in accordance with the invention are to be understood in this sense.

It is another critical condition for this homogeneous mixture of solvents and non-solvents that the boiling point of the non-solvent is higher than that of solvent. Preferred is a substantial difference between the boiling points of, for example, as least 15° C. However, substantially greater differences of, for example, at least 50° C. may also be used advantageously. It is just a not unessential characteristic of the new process that there exists hardly an upper limit to the boiling temperature of the non-solvent because distillation of the non-solvent portion is completely unnecessary in the process according to the invention.

According to the invention, the starting material to be subjected to the division process is dissolved in the mixture of the solvent and non-solvent. The next step of the process is the precipitation of the polymer in the form of finely divided particles. This may be effected advantageously by partial distillation, preferably vacuum distillation of the solution. Initially, the lower boiling solvent portions distil in this distillation so that the non-solvent action predominates after some time. After this point has been reached, the dissolved copolymer begins to precipitate. When properly selecting the process conditions, it precipitates in the form of a suspension or dispersion of fine particles in the residue of the liquid phase initially charged. Another possibility of obtaining the suspension or dispersion of the finely divided solids is a reduction in the temperature of the solution. This measure may also be combined with the distillation step. In commercial operation, such a combination of the measures for the precipitation of the solids will be used as a rule. The abstraction of energy occurring through the heat of evaporation in vacuum distillation leads at the same time to cooling of the mixture.

In a further step of the process of the invention, the precipitated copolymer powder is isolated from this primarily obtained suspension or dispersion without a substantial re-fusion of the precipitated particles taking place. This is achieved in accordance with the invention by the use of additional amounts of the non-solvent. This additional non-solvent must meet the requirement that it is homogeneously miscible with the residual liquid still in contact with the precipitated copolymer. Various methods may be used in this step. For example, additional non-solvent may be added to the suspension or dispersion of the finely divided solids obtained by distillation and/or cooling whereupon the solid phase may be separated from the liquid phase. However, it is also conceivable to separate previously the initially precipitated polymer from the residual liquid phase of the initial solvent mixture and then slurry the wet solid mass in further non-solvent portions. If desired, this operation may be repeated in a plurality of successive steps.

The newly used non-solvents may be identical with the previously used particular non-solvent. In any case, the residual content of initially used solvent in the mass is successfully reduced considerably when operating in this manner thereby permitting eventually the recovery of a non-swollen powder. However, in a preferred embodiment of the invention, it is possible that non-solvents having an increasing non-solvent action on the copolymer are used in these different displacement steps. When selecting the treating liquids in this manner, it is achieved that the polymer powder is suspended in steps and "washed" in liquids which have an increasingly strong non-solvent character. It is possible in this manner by proper selection of reaction auxiliaries to convert the initially organic solution phase gradually into an aqueous dispersion phase and thereby obtain substantially complete displacement of all organic liquid portions from the polymer product. For example, a very simple sequence of operation is as follows:

The mixture of solvent and non-solvent used for the dissolution and precipitation of the polymer is a mixture of a typical solvent such as trichloroethylene and a rather efficient non-solvent such as methyl cellosolve. Removal of at least a considerable portion of the trichloroethylene results in precipitation of the polymer in a finely divided form in the remaining liquid portion. This mass is mixed immediately or after separation of the excess liquid with a stronger non-solvent, e.g. of the type of a lower alcohol such as ethanol. After having allowed sufficient time of action to elapse, the powder is again separated from this suspension, and the moist product is mixed with water. This last step has the result that the organic liquids are very extensively removed from the copolymer so that an aqueous suspension or dispersion of the copolymer is obtained which may be processed as such or subjected to drying in conventional manner. However, it has been found that the use of water as an extremely poor solvent may entail certain problems. If a sample obtained by centrifuging and still highly wet with alcohol is dispersed in pure water, an enlargement of the particles of material may result. This may possibly be contributed to an excessively great step in the non-solvent properties of the particular liquids. Thus, to be able of using water advantageously as the last agent of a displacement series, it is preferred in accordance with the invention to insert one or more intermediate steps in which the treatment is effected with mixtures of water and the organic non-solvent and, if desired, treating agents of varying composition, especially with an increasing water content are used.

It is preferred in the process according to the invention to perform all of the operating steps at temperatures which are at best moderately elevated. However, this is not absolutely necessary at least for the dissolution step and the precipitation. However, in these steps, the temperature used is limited only by the thermal sensitivity of the material. Here again, the use of relatively low temperatures will be desirable from the economic point of view. Therefore, as a rule, temperatures of not more than about 65° C. and preferably not more than 55° C. are used. The thermal sensitivity of the treating process according to the invention decreases to the extent to which the organic solvent phase is displaced from the mixture. In the practice of the commercial process, the removal of the liquid portions remaining after the precipitation may be effected by treatment, preferably in steps, with further non-solvent portions at room temperature. However, an increase in temperature kept within the limits mentioned above may be used to reduce the exchange time.

The relative proportions of solvent and non-solvent which may be used in the particular case may be determined by simple tests. In general, use will be made of a mixture which has a limited excess of solvent over the amount of non-solvent used, it being possible to approach about equal relative proportions of solvent to non-solvent. However, these factors are very largely determined by the particular solvent properties of the auxiliary agents used so that it is recommendable to adapt the process conditions used in the particular case to the selected couple of liquids.

In a typical embodiment of the process according to the invention, the stereospecific styrene-butadiene copolymer is dissolved in a mixture of 5 to 7 parts by weight of at least one solvent and 4 parts by weight of at least one non-solvent for the copolymer at as low a temperature as is possible. The solution is then subjected to vacuum distillation until a dispersion is obtained. The dispersion is subsequently mixed with another non-solvent which has still stronger non-solvent properties with respect to the copolymer, it being possible, for example, to use the same amount of the second non-solvent. This mixture is then thoroughly stirred and allowed to stand whereupon the solids are separated. The solids may be dried in conventional manner or dispersed in a further non-solvent and separated again.

Suitable solvents for the type of polymer described herein are known to the skilled artisan. Examples hereof include hydrocarbons such as cyclohexane, benzene, toluene, xylenes, halogenated hydrocarbons such as chloroform, ethylene chlorice, butyl chloride, trichloroethylene, carbon tetrachloride, 1,1,2,2-tetrachloroethane, bromobenzene, nitrobenzene, diethyl ether, butyric aldehyde, methyl isobutyl ketone, ethyl acetate, amyl acetate, cellosolve acetate, etc.

Typical non-solvents include especially compounds containing polar groups, preferably oxygen-containing compounds such as alcohols, e.g. aliphatic alcohols (ethanol, propanol, isopropanol or alcohols having from 4 to 10 carbon atoms, etc.), ketones and especially higher ketones of the type of acetone, polyhydric alcohols such as glycols, highly polar compounds of the type of acetonitrile, nitromethane. Further suitable non-solvents are paraffins such as n-hexane etc. Non-solvents which are particularly suitable for the dissolution step are monoalkyl ethers of ethylene glycol, especially methyl glycol (methyl cellosolve). An extreme non-solvent for the polymer is, of course, water. This may be used in the process according to the invention but, of course, only after the powder is present in suspension in an already sufficiently water-soluble liquid. The preferred nonsolvents are selected while having regard to their boiling properties and bearing in mind that the non-solvent must have a higher boiling point than that of the solvent. Thus, for example, the boiling point of the non-solvents is desirably above 100° C.

Separation of the solids portion from the liquid portions may be effected in each case by suction filtration or centrifuging. After sufficient removal of the initial solvent, the product may be dried. Drying temperatures below 50° C. may be desirable. Drying may, for example, be effected in an oven with recirculated hot air. If the product, prior to drying, is dispersed in a liquid which has no solvent action at all, e.g. in water, drying may be effected at higher temperatures and a product having a still smaller particle size is obtained.

It is possible with the process according to the invention to prepare ultrafine or coarser powders of the starting material depending upon the selection of the process conditions. Of particular interest in practice may be particle sizes up to about 400 microns, e.g. in the range of from about 90 to 400 microns. Powders of this kind can, for example, be processed in a particularly simple manner in automobile tire industry in fully automatically operating metering units. Powders of still smaller particle size, i.e. within the range of a few microns up to about 100 microns, may also be prepared for other uses.

EXAMPLE 1

2 kilograms of "Cariflex" K–101 were dissolved in a mixture of 4 liters of trichloroethylene (3 parts by weight) and 4 liters of methyl glycol (2 parts by weight) at an oil bath temperature of 60° C. (temperature of the mass, 55° C.) and the solution was subjected to vacuum distillation at about 100 mm. Hg. for 3.5 hours. In this distillation, the temperature of the mass dropped to about 45° C. and about 3 liters of condensate (substantially trichloroethylene) distilled. The resultant dispersion was mixed with 5 liters of technical-grade ethyl alcohol, the mixture stirred for 30 minutes and then allowed to stand for 12 hours. Thereafter, the liquid was removed from the solids by suction filtration. The solids were spread on a metal sheet and dried in a hot air circulation oven at an air temperature of about 30° C. The powder thus obtained had a particle size of from 90 to about 400 microns.

EXAMPLE 2

By the procedure described in Example 1, a dispersion was prepared from 2 kgs. of "Cariflex" K–101 and a mixture of 4 liters of trichloroethylene and 4 liters of methyl glycol. To the resultant dispersion were added 5 liters of technical-grade ethyl alcohol. The mixture was stirred for 30 minutes and then allowed to stand for 6 hours. The solids are separated by suction filtration and suspended again in 5 liters of 65% ethanol, stirred for 30 minutes and then allowed to stand for 6 hours. The whole procedure is subsequently repeated with 25% ethanol and then again with pure water. The resultant product can be dried without substantial enlargement of the particles even under mechanical action and at operating temperatures of about 50° C. In this manner, a product 90% of which has a particle size smaller than 150 microns is obtained.

EXAMPLE 3

800 grams of "Cariflex" K–101 are dissolved in a mixture of 3 liters (6 parts by weight) of carbon tetrachloride and 1.2 liters (1.25 parts by weight) of n-propanol at a heating temperature of 60° C. (temperature of the mass, 53° C.). The solution is cooled to about 27° C. while stirring to give a milky-white dispersion containing the precipitated product in the form of fine particles. The dispersion is then subjected to vacuum distillation at about 100 mm. Hg. for 1.5 hours. During the distillation, about 1.5 liters of condensate (predominantly carbon tetrachloride) distil.

To the resultant dispersion are added 3 liters of technical-grade methyl alcohol. The mixture is stirred for about 30 minutes and then allowed to stand for 12 hours.

Thereafter the product is processed in the manner described in Example 1 to give a powder the particles of which have a size of between about 100 and 500 microns.

What is claimed is:

1. A process for the production of finely divided stereo-specific styrene-butadiene copolymer having a styrene content of about 23–24% from a corresponding coarser copolymer composition which comprises dissolving the coarser material in a homogeneous solvent mixture of at least one halogenated solvent for the copolymer and a least one oxygen-containing non-solvent for the copolymer, the non-solvent part having a higher boiling point by at least 15° C. than that of the solvent; thereafter removing from the mixture by vacuum distillation the solvent portion to an extent at least sufficient that the dissolved copolymer is precipitated in the form of a dispersion, and finally purifying the material thus precipitated by treating it with further non-solvent which is homogeneously miscible with the residual liquid.

2. The process of claims 1, wherein the displacement of liquid portions from the mixture thereof with the precipitated finely divided material is effected in steps in such a manner that the moist finely divided material is treated with a non-solvent which is srtonger as compared with the non-solvent present in the mixture with the copolymer.

3. The process according to claims 1, wherein a maximum temperature of about 65° C. is not exceeded when dissolving and when precipitating the copolymer.

4. The process according to claim 1, wherein a mixture of a major proportion of solvent and a minor proportion of non-solvent is used when dissolving the coarse copolymer.

5. The process of claim 1, wherein the finely divided solid is separated from accompanying solvent and nonsolvent liquid providing separated finely divided material and entrained liquid, and treating the separated finely divided material and entrained liquid with a non-solvent for the copolymer which is homogeneously miscible with the entrained liquid.

6. Process according to claim 1, wherein cooling is combined with said distillation to effect said precipitation.

References Cited

UNITED STATES PATENTS 2,953,555  9/1960  Miller et al. _____ 260—85.1X
2,991,279  7/1961  Miller et al. _____ 260—85.1X
3,058,971  10/1962 Miller et al. _____ 260—94.7X

FOREIGN PATENTS 472,502  7/1951  Canada _____ 260—94.9

JOSEPH L. SCHOFER, Primary Examiner
WILLIAM F. HAMROCK, Assistant Examiner

U.S. Cl. X.R.

260—96